United States Patent
Bartling

(10) Patent No.: US 8,378,633 B2
(45) Date of Patent: Feb. 19, 2013

(54) MULTICHANNEL DC CONTROLLER OPERATING INDEPENDENTLY OF OUTPUT POWER IN CRITICAL CONDUCTION MODE

(75) Inventor: Ralf Bartling, Fröndenberg (DE)

(73) Assignee: Kostal Industrie Elektrik GmbH, Luedenscheid (DE)

( * ) Notice: Subject to any disclaimer, the term of this patent is extended or adjusted under 35 U.S.C. 154(b) by 451 days.

(21) Appl. No.: 12/713,612

(22) Filed: Feb. 26, 2010

(65) Prior Publication Data

US 2010/0164435 A1   Jul. 1, 2010

Related U.S. Application Data

(63) Continuation-in-part of application No. PCT/EP2008/061422, filed on Aug. 29, 2008.

(30) Foreign Application Priority Data

Aug. 31, 2007   (DE) .................. 10 2007 041 510

(51) Int. Cl.
*H02J 7/00* (2006.01)
(52) U.S. Cl. ........................................ 320/128; 320/140
(58) Field of Classification Search .................. None
See application file for complete search history.

(56) References Cited

U.S. PATENT DOCUMENTS

| | | | |
|---|---|---|---|
| 5,905,369 A | | 5/1999 | Ishii et al. |
| 7,288,924 B2 * | | 10/2007 | Trandafir et al. ............ 323/283 |
| 2007/0216319 A1 * | | 9/2007 | Wai et al. ...................... 315/247 |
| 2008/0067872 A1 * | | 3/2008 | Moth .............................. 307/66 |

FOREIGN PATENT DOCUMENTS

| | | |
|---|---|---|
| DE | 102004011801 A1 | 6/2005 |
| EP | 0837548 A2 | 4/1998 |
| JP | 20043357388 A1 | 12/2004 |

OTHER PUBLICATIONS

Abstract of Blaise Destraz et al., IEEE Xplore, High Efficient Interleaved Multi-Channel dc/dc Converter Dedicated to Mobile Applications, Oct. 2006.
Abstract of Scheible, et al. IEEe Xplore, System engineering aspects and power electronics in an autonomous photovoltaic-hydrogen system, Dec. 1998.
The International Bureau of WIPO, International Preliminary Report on Patentability for the corresponding International Application No. PCT/EP2008/061422 mailed Apr. 15, 2010.

* cited by examiner

*Primary Examiner* — Drew A Dunn
*Assistant Examiner* — Robert Grant
(74) *Attorney, Agent, or Firm* — Brooks Kushman P.C.

(57) ABSTRACT

A multichannel bidirectional DC converter includes first and second parallel current channels and a controller. The first channel has a first inductor, first and second switches, and a device operable for detecting a current null passage (zero crossing) of current of the first inductor. The second channel has a second inductor and third and fourth switches. The controller controls the switches to turn on and off such that the channels can be driven in either a boost converter mode or a buck converter mode at a given time. The controller is operable with the device of the first channel for detecting a period of the current null passage of the first inductor. The controller drives the channels with a time delay with respect to one another based on the detected period such that the channels operate in a critical conduction mode.

20 Claims, 9 Drawing Sheets

US 8,378,633 B2

MULTICHANNEL DC CONTROLLER OPERATING INDEPENDENTLY OF OUTPUT POWER IN CRITICAL CONDUCTION MODE

CROSS-REFERENCE TO RELATED APPLICATIONS

This application is a continuation-in-part of International Application PCT/EP2008/061422, published in German, with an international filing date of Aug. 29, 2008, which claims priority to DE 10 2007 041 510.0, filed Aug. 31, 2007; the disclosures of which are both hereby incorporated by reference.

BACKGROUND OF THE INVENTION

1. Field of the Invention

The present invention relates to a bidirectional DC converter having parallel current channels which controlled at a time offset with respect to one another.

2. Background Art

A direct current to direct current (DC/DC) converter (referred to herein as "DC converter") converts a DC input voltage and a DC input current into a different DC output voltage and a different DC input current. For instance, a DC boost converter converts the input voltage and the input current into an increased output voltage and a decreased output current. Conversely, a DC buck converter converts the input voltage and the input current into a decreased output voltage and an increased output current. A DC boost/buck converter can function at a given time either as a DC boost converter or a DC buck converter. A bidirectional DC converter is capable of transferring power from an input end to an output end and vice versa. That is, at a given time, one end is the input end or the output end with the other end being the other of the input end or the output end.

DE 10 2004 011 801 A1 describes a DC boost converter having parallel current channels which are controlled by external timing elements.

SUMMARY OF THE INVENTION

An object of the present invention is a DC converter which outputs relatively smooth output current while being simple and economical to build and being relatively flexible and efficient.

In carrying out the above object and other objects, the present invention provides a multichannel bidirectional DC converter having first and second current channels and a controller. The current channels are in parallel to one another and a controller. The first current channel has a first inductor, first and second switches, and a device operable for detecting a current null passage (zero crossing) of current of the first inductor. The second current channel has a second inductor and third and fourth switches. The controller is operable for controlling the switches to turn on and off such that the current channels can be driven in either a boost converter mode or a buck converter mode at a given time. The controller is operable with the device of the first current channel for detecting a period of the current null passage of the first inductor. The controller drives the first and second current channels with a time delay with respect to one another based on the detected period such that the first and second current channels operate in a critical conduction mode.

In embodiments of the present invention, a bidirectional DC converter includes a plurality of parallel current channels. Each current channel has an inductor and a pair of semiconductor switches by means of which the current channels can be driven by a micro-controller either as boost or buck converters. To this end, the current channels are driven at a time offset to one another. At least one of the current channels includes a device such as a winding associated with the inductor of this current channel for detecting current null passages (zero crossings) of current in this current channel. The micro-controller is operable with the device for detecting the periodicity of the current null passages in this current channel. The micro-controller operates the DC converter by driving the current channels in critical conduction mode based on the detected period.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 2:
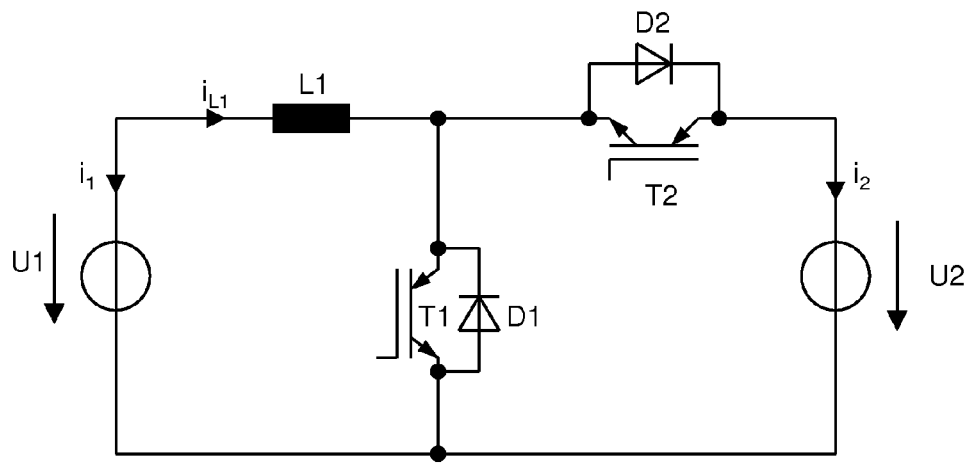
FIG. 2 illustrates a single channel bidirectional DC converter.

Turning initially to FIG. 2, a single channel bidirectional DC converter is shown. This DC converter includes a first voltage source U1, a second voltage source U2, an inductor (i.e., a choke coil) L1, a first semiconductor switch T1, and a second semiconductor switch T2. Each switch T1, T2 is a transistor such as an insulated gate bipolar transistor (IGBT). A first free-running diode D1 is connected in parallel to first switch T1. First diode D1 is poled to conduct current in a direction opposite to the direction of current through first switch T1. A second free-running diode D2 is connected in parallel to second switch T2. Second diode D2 is poled to conduct current in a direction opposite to the direction of current through second switch T2.

While first switch T1 is on (meaning that the switch is closed) and while second switch T2 is off (meaning that the switch is open), first voltage source U1, inductor L1, and first switch T1 are connected together and form a closed circuit. As such, inductor L1 is connected to first voltage source U1 through first switch T1. While second switch T2 is on and while first switch T1 is off, first voltage source U1, inductor L1, second switch T2, and second voltage source U2 are connected together and form a closed circuit. As such, inductor L2 is connected in series with second switch T2 and first and second voltage sources U1, U2.

The basic operation principle of a bidirectional DC converter involves periodically turning on and off one of the switches T1 or T2, while the other one of the switches T2 or T1 remains turned off. When the one of the switches T1 or T2 is turned on, a current is caused to flow through inductor L1, which thereby builds up a magnetic field. When the one of the switches T1 or T2 is turned off, the energy stored in the magnetic field is discharged causing an induction current (output current $i_2$ or $i_1$) which flows through the diode D2 or D1 associated with the other one of the switches T2 or T1.

For example, first switch T1 is turned on and off while second switch T2 remains turned off. When first switch T1 is turned on, a current is caused to flow through inductor L1, which thereby builds up a magnetic field. When first switch T1 is turned off, the energy stored in the magnetic field is discharged causing an output current $i_2$ to flow through second diode D2. Similarly, second switch T2 is turned on and off while first switch T1 remains turned off. When second switch T2 is turned on, a current is caused to flow through inductor L1, which thereby builds up a magnetic field. When second switch T1 is turned off, the energy stored in the magnetic field is discharged causing an output current $i_1$ to flow through first diode D1.

As described, one of switches T1 or T2 is periodically turned on and off while the other one of switches T2 or T1 remains turned off. To achieve such continuous operation, a timing signal is required for the one of switches T1 or T2 being turned on and off. Such a timing signal may be provided by a pulse-width-modulation (PWM) controller in communication with the one of switches T1 or T2. Such a PWM controller can be implemented by a central controller and is particularly suited for implementation by a micro-controller. Herein, such a PWM controller will be designated as a micro-controller without restricting any generality. For purposes of simplification, no representation of the micro-controller is shown herein.

A bidirectional DC converter has two fundamental operating modes: boost converter mode and buck converter mode.

In the boost converter mode, energy flows from first voltage source U1 toward second voltage source U2. First switch T1 is driven by a suitable PWM voltage signal $u_{T1}$ to periodically turn on and off and second switch T2 is not active (i.e., second switch T2 remains turned off). As second switch T2 remains turned off, no current flows through second switch T2. In order for this circuit to operate in the boost converter mode, the voltage $u_2$ of second voltage source U2 is larger than the voltage $u_1$ of first voltage source U1.

In the buck converter mode, energy flows from second voltage source U2 toward first voltage source U1. Second switch T2 is driven by a suitable PWM voltage signal $u_{T2}$ to periodically turn on and off while first switch T1 is not active (i.e., first switch T1 remains turned off). As first switch T1 remains turned off, no current flows through first switch T1. In order for this circuit to operate in the buck converter mode, the voltage $u_2$ of second voltage source U2 is larger than the voltage $u_1$ of first voltage source U1 just like in the boost converter mode.

In either the boost converter mode or the buck converter mode, the DC converter has three different operating states: continuous operation; discontinuous operation; and critical conduction mode (transition mode) operation. These operating states are determined by the behavior of inductor current $i_{L1}$ of inductor L1.

Figure 3:
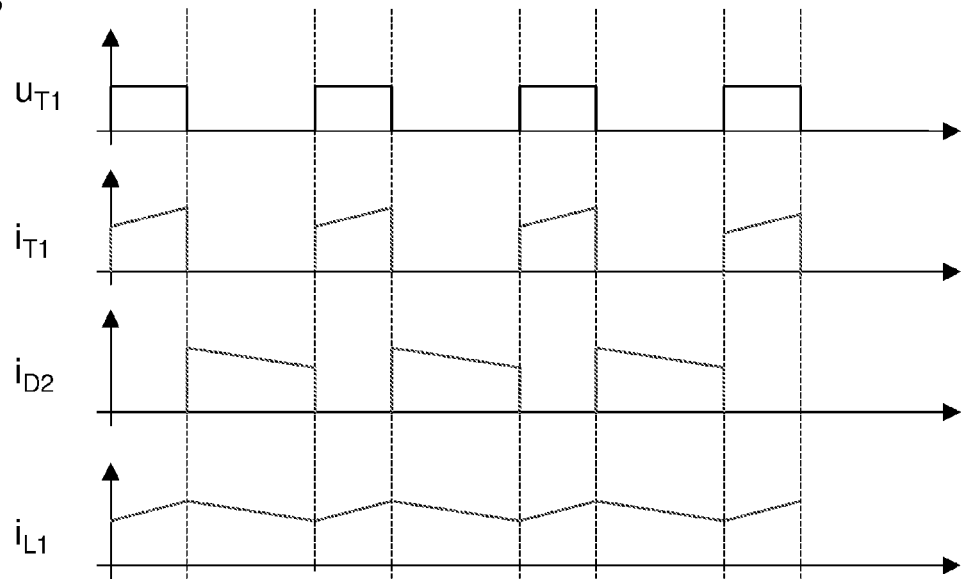
FIG. 3 illustrates voltage and current profile diagrams of a bidirectional DC converter while functioning as a DC boost converter operating in the continuous operation state.
Figure 4:
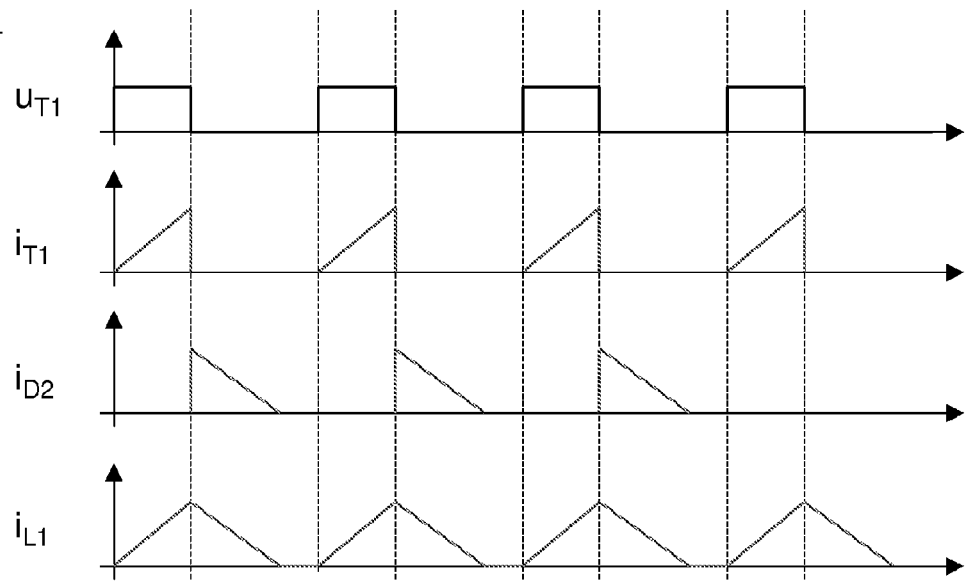
FIG. 4 illustrates voltage and current profile diagrams of the bidirectional DC converter while functioning as a DC boost converter operating in the discontinuous operation state.
Figure 5:
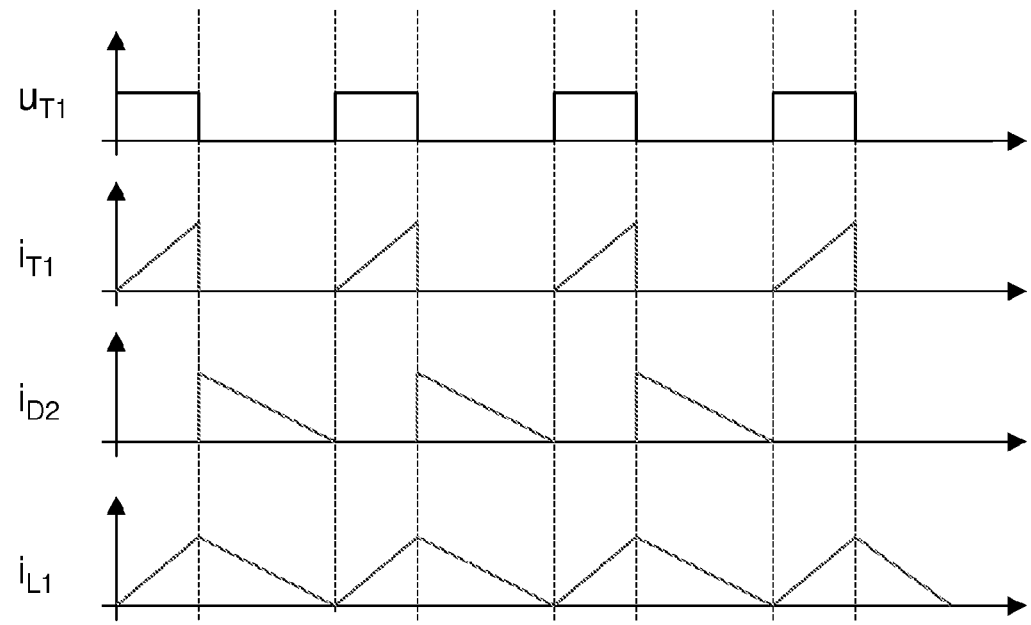
FIG. 5 illustrates voltage and current profile diagrams of the bidirectional DC converter while functioning as a DC boost converter operating in the critical conduction mode operation state.

FIGS. 3, 4, and 5 are in regard to the operation of a bidirectional DC converter in the boost converter mode. In particular, FIG. 3 illustrates voltage and current profile diagrams of the bidirectional DC converter while functioning as a boost converter operating in the continuous operation state; FIG. 4 illustrates voltage and current profile diagrams of the bidirectional DC converter while functioning as a DC boost converter operating in the discontinuous operation state; and FIG. 5 illustrates voltage and current profile diagrams of the bidirectional DC converter while functioning as a DC boost converter operating in the critical conduction mode operation state.

In FIGS. 3, 4, and 5, $u_{T1}$ represents the control voltage of first switch T1 (high voltage means first switch T1 is turned on and low voltage means first switch T1 is turned off), $i_{T1}$ represents the current flowing through first switch T1, $i_{D2}$ represents the current flowing through second diode D2 associated with second switch T2, and $i_{L1}$ represents the current flowing through inductor L1.

With reference to FIG. 3, the continuous operation state in the boost converter mode is characterized by the current $i_{L1}$ flowing through inductor L1 not making any null passages (i.e., the current $i_{L1}$ is never equal to zero, has no zero points, etc.). With reference to FIG. 4, the discontinuous operation state in the boost converter mode is characterized by the current $i_{L1}$ flowing through inductor L1 equaling zero for a duration of time (i.e., no current flows through inductor L1 for a duration of time). With reference to FIG. 5, the critical conduction mode operation state in the boost converter mode is characterized by the current $i_{L1}$ flowing through inductor L1 equaling zero for an instant (i.e., no current flows through inductor L1 for an instant). Here, by suitable control of first switch T1, the current $i_{L1}$ flowing through inductor L1 is maintained in the critical conduction mode, which means that it is held precisely between continuous and discontinuous operation.

In the boost converter mode, during the on phase of first switch T1, the inductor current $i_{L1}$ depends on the following differential equation:

$$u_{L1} = L^*(di_{L1}/dt)$$

This differential quotient is positive. Hence the inductor current $i_{L1}$ rises in this phase.

In the boost converter mode, during the off phase of first switch T1 (i.e., when second diode D2 is conducting), the inductor current $i_{L1}$ depends on the following differential equation:

$$u_1 - u_2 = L^*(di_{L1}/dt)$$

As voltage $u_2$ is larger than $u_1$ (i.e., as second voltage source U2 has a larger voltage than first voltage source U1), this differential quotient is negative. Hence, the inductor current $i_{L1}$ drops in this phase.

In general, in the boost converter mode, the behavior of inductor current $i_{L1}$ depends on the on time (in relation to the off time) of first switch T1, voltages $u_1$, $u_2$ of first and second voltage sources U1, U2, and the inductance L of inductance L of inductor L1.

With reference to FIG. 5, an advantage of the critical conduction operation state in the boost converter mode is that first switch T1 is switched at the zero current instant thus keeping switching losses minimal. In addition, first diode D1 can be designed as a "normal" fast silicon diode. For instance, first diode D1 may be a carbide diode which is frequently used in boost (solar) converters as the so-called reverse recovery current of the diode decisively determines the losses in first switch T1. Further, inductor L1 is optimally utilized as there is no time interval (i.e., no more than an instant of time) in which inductor L1 is current-less and does not transfer energy.

In a DC converter that operates with a constant switching frequency, the respective load state determines which of the three abovementioned operating states is effective.

Figure 6:
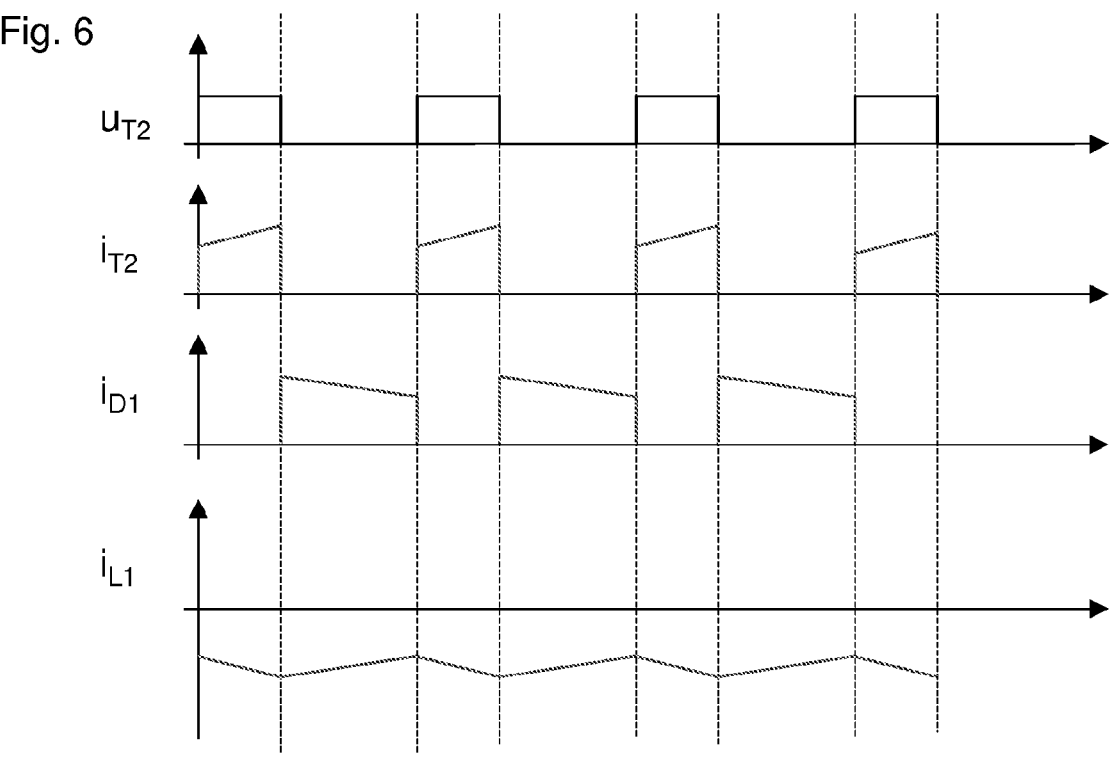
FIG. 6 illustrates voltage and current profile diagrams of the bidirectional DC converter while functioning as a DC buck converter operating in the continuous operation state.
Figure 7:
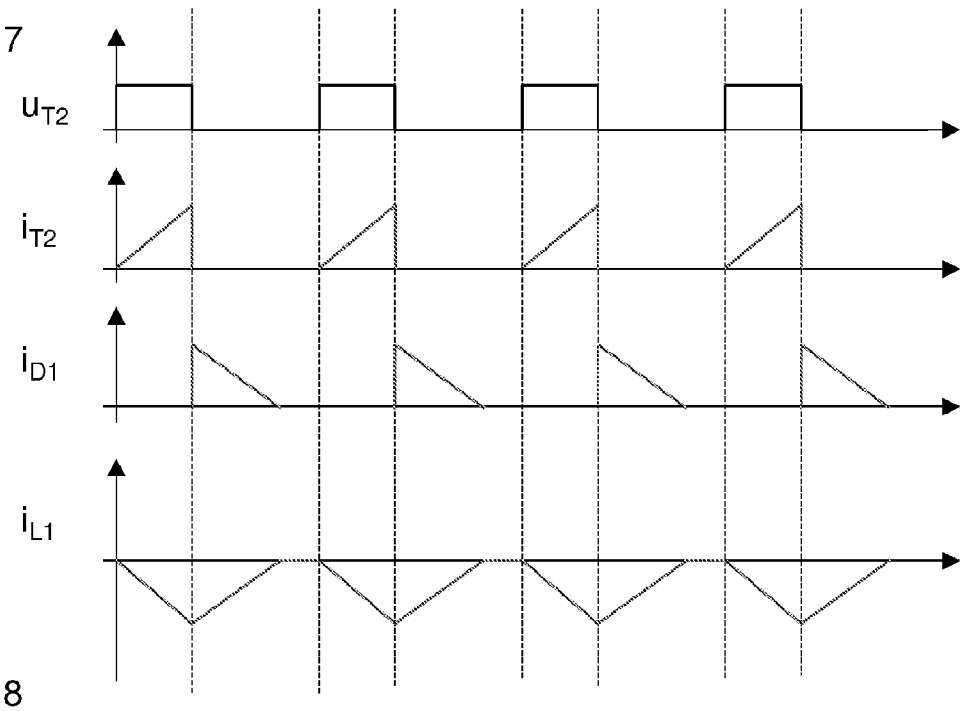
FIG. 7 illustrates voltage and current profile diagrams of the bidirectional DC converter while functioning as a DC buck converter operating in the discontinuous operation state.
Figure 8:
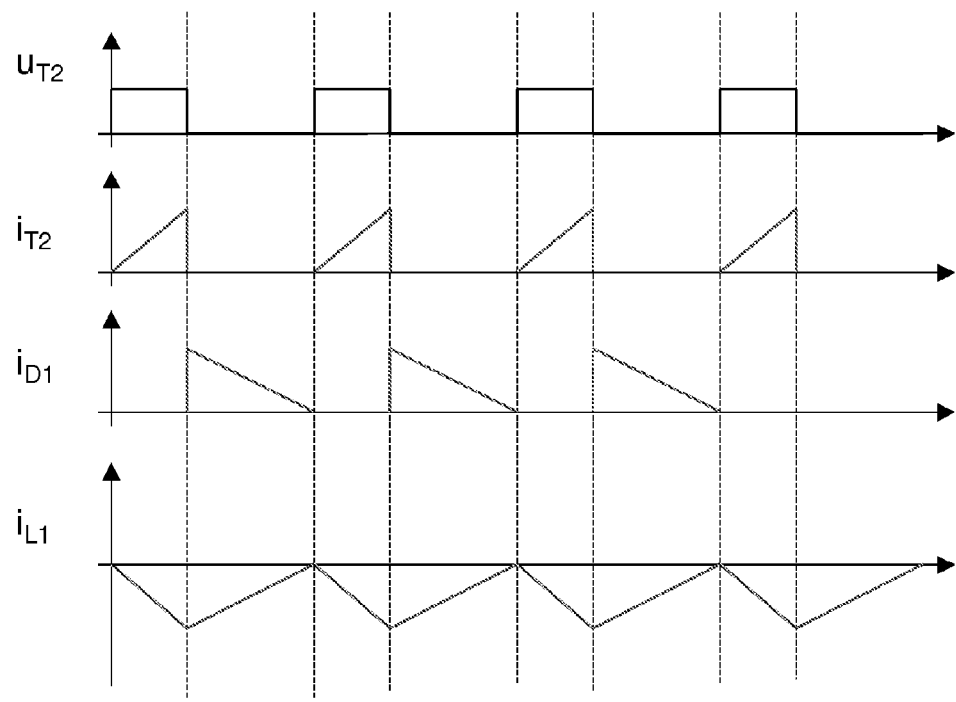
FIG. 8 illustrates voltage and current profile diagrams of the bidirectional DC converter while functioning as a DC buck converter operating in the critical conduction mode operation state.

FIGS. 6, 7, and 8 are in regard to the operation of the bidirectional DC converter in the buck converter mode. In particular, FIG. 6 illustrates voltage and current profile diagrams of the bidirectional DC converter while functioning as a buck converter operating in the continuous operation state; FIG. 7 illustrates voltage and current profile diagrams of the bidirectional DC converter while functioning as a buck converter operating in the discontinuous operation state; and FIG. 8 illustrates voltage and current profile diagrams of the bidirectional DC converter while functioning as a buck converter operating in the critical conduction mode operation state.

In FIGS. 6, 7, and 8, $u_{T2}$ represents the control voltage of second switch T2 (high voltage means second switch T2 is turned on and low voltage means second switch T2 is turned off), $i_{T2}$ represents the current flowing through second switch T2, $i_{D1}$ represents the current flowing through first diode D1 associated with first switch T1, and $i_{L1}$ represents the current flowing through inductor L1.

With reference to FIG. 6, the continuous operation state in the buck converter mode is characterized by the inductor current $i_{L1}$ not making any null passages. With reference to FIG. 7, the discontinuous operation state in the buck converter mode is characterized by the inductor current $i_{L1}$ equaling zero for a duration of time. With reference to FIG. 8, the critical conduction mode operation state in the buck converter mode is characterized by the inductor current $i_{L1}$ equaling zero for an instant. Here, by suitable control of second switch T2, the inductor current $i_{L1}$ is maintained in the critical conduction mode, which means that it is held precisely between continuous and discontinuous operation.

The behavior of inductor current $i_{L1}$ and the general operation of the DC converter in the buck converter mode at the three different operating states is analogous to the description regarding the DC converter in the boost converter mode.

The above describes the two modes and the three different operating states of a bidirectional DC converter. Such a DC converter can be used in solar technology for battery management of an electrical isolated inverter.

Figure 9:
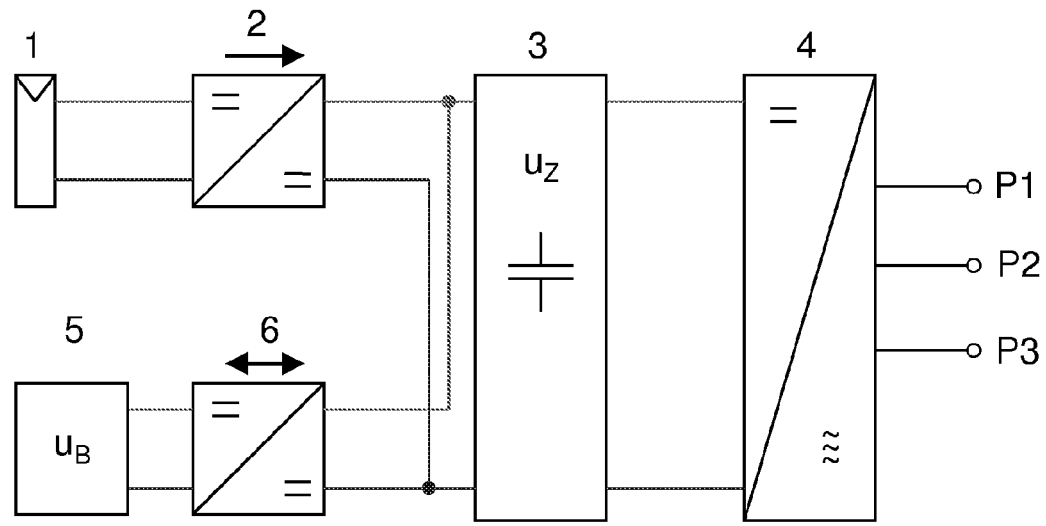
FIG. 9 illustrates an example of an application of a bidirectional DC converter.

Referring now to FIG. 9, an example of an application of a bidirectional DC converter will be described. The application in FIG. 9 is a solar plant. The solar plant is supplied with energy by a solar generator 1. Solar generator 1 is connected through a unidirectional DC boost converter 2 to a DC voltage intermediate circuit 3. The energy from solar generator 1 can then be fed into the official network from a power inverter 4 having output-side phases P1, P2, and P3.

When solar generator 1 produces more power than needed for supplying the grid, a storage battery 5 can be charged with power from solar generator 1 via a bidirectional DC converter 6. The condition for this to occur is the voltage $u_z$ in DC intermediate circuit 3 being larger than the voltage $u_B$ of storage battery 5. DC converter 6 operates in this case as a buck converter and energy flows from DC intermediate circuit 3 to storage battery 5.

In turn, if more energy is required by the grid than can be supplied by solar generator 1, then storage battery 5 can feed additional energy into DC intermediate circuit 3 via DC converter 6. This assumes that storage battery 5 has been sufficiently charged and that the voltage $u_z$ in DC intermediate circuit 3 is larger than the voltage $u_B$ of storage battery 5. DC converter 6 operates in this case as a boost converter and energy flows from storage battery 5 to DC intermediate circuit 3.

As indicated above, pulse-width-modulation having a fixed frequency is often used to control the switch of a bidirectional DC converter which is to be periodically turned on and off to have a duty cycle. Consequently, depending on the load condition, the DC converter can be operated in one of the continuous, discontinuous, or critical conduction mode operating states at a given time and can alternate between the operating states over a period of time.

From the point of view of control engineering, a subordinate current control circuit is generally provided for generating the PWM voltage signal for controlling the switch which is to be turned on and off. The current control circuit can be implemented in hardware, e.g., with a controlling integrated chip or with the aid of a micro-controller. In photovoltaic power inverters, digitally controlled systems are used so that for current control the current set-point is obtained in real time and is processed.

Figure 10:
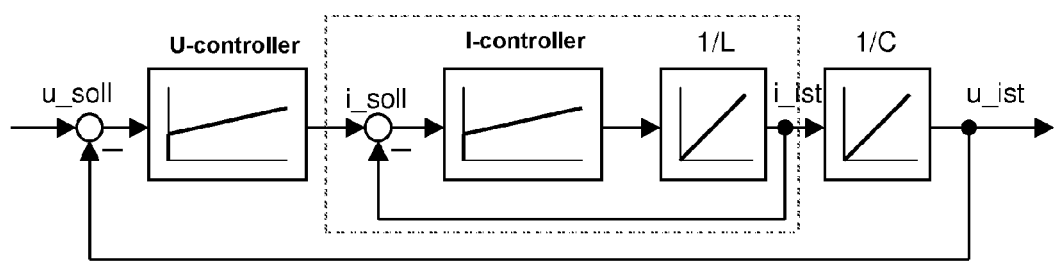
FIG. 10 illustrates a current control circuit for use with a bidirectional DC converter.

Referring now to FIG. 10, a current control circuit for use with a bidirectional DC converter is shown. This current control circuit achieves regulation in the form of a cascade control. This current control circuit includes an inner "faster" control circuit (shown in dashed lines) and an outer control circuit. The inner control circuit includes current set-point i_soll, I-controller, integrating controller 1/L, instantaneous current value i_ist. The outer control circuit includes voltage set-point u_soll, U-controller, integrating controller 1/C, instantaneous voltage value u_ist for voltage regulation.

This current control circuit has the following disadvantages. The instantaneous current value i_ist must be detected and processed in real time. Depending on the operation state (continuous, discontinuous, or Transition Mode) of the DC converter the properties of the current control path change so that under certain conditions matching must be carried out in the I-controller. As the inductance L of inductor L1 largely determines the behavior of the current control circuit, this value should not drop below a certain lower limit. When the DC converter is operating in the continuous operation state, the losses rise sharply in the active switch because this switch switches to a conducting free-running diode. The reverse recovery charging of the diode largely affects the turn-on losses of the active switch. In order to reduce the so-called reverse recovery losses, silicon carbide diodes are often used in place of conventional silicon diodes. Such diodes are expensive, hard to find, and not very robust. Due to the "hard" switching operation of the final power stages, the switching frequency is often chosen to be as low as possible. This leads to an increase in the amount of space needed for the inductor.

Figure 11:
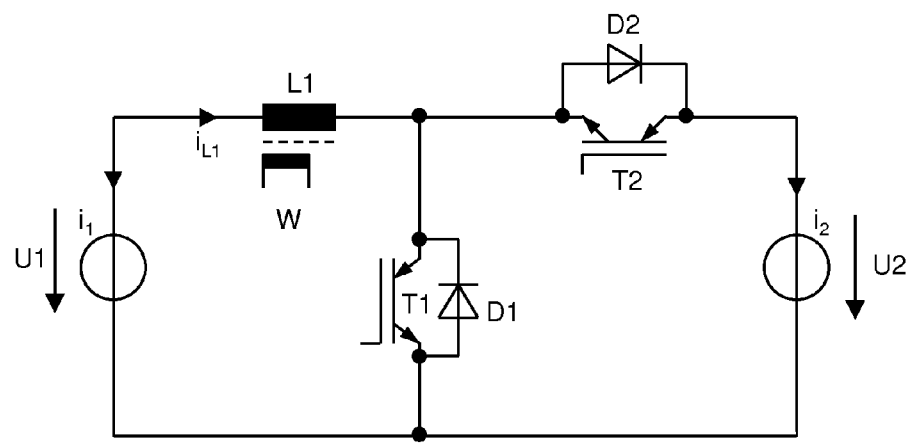
FIG. 11 illustrates a bidirectional DC converter that can operate continuously in the critical conduction mode operation state in accordance with an embodiment of the present invention.

Referring now to FIG. 11, a bidirectional DC converter that can operate continuously in the critical conduction mode operation state in accordance with an embodiment of the present invention is shown. This DC converter differs from the DC converter shown in FIG. 2 in that this DC converter includes a winding W which enables this DC converter to operate continuously in the critical conduction mode operation state. Winding W is added to inductor L1 and requires only a few windings. Winding W is used to detect the current null passage in inductor L1 (i.e., to detect when inductor current $i_{L1}$ is zero). The instant of the current null passage can be detected, for example, by a micro-controller in communication with winding W. Upon detection of the current null passage, the micro-controller immediately switches the active switch T1 or T2, which is off, to on. Depending on the load state, this produces a variable switching frequency in the final power stage. The higher the output power, the lower the switching frequency becomes.

Figure 12:
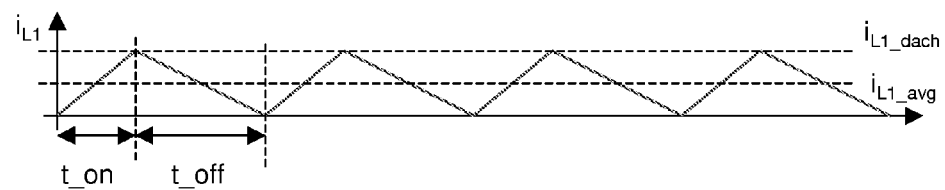
FIG. 12 illustrates a current profile diagram of the bidirectional DC converter shown in FIG. 11 in boost converter mode.

Referring now to FIG. 12, with continual reference to FIG. 11, a current profile diagram of the bidirectional DC converter shown in FIG. 11 in boost converter mode is shown.

If the time in the magnetization phase is designated by "t_on" and the time in the demagnetization phase is designated as "t_off", then the following equations can be established while considering linear relationships:

$$i_{L1\_dach}=u_1*(t\_on/L) \quad i_{L1\_dach}=(u_2-u_1)*(t\_off/L)$$

It can be seen from FIG. 12 that the average value $i_{L1\_avg}$ of inductor current $i_{L1}$ is one-half of the maximum current value $i_{L1\_dach}$. Thus, by prescribing the switch-on time t_on, the average value $i_{L1\_avg}$ of inductor current $i_{L1}$ can be adjusted directly and without delay.

Figure 13:
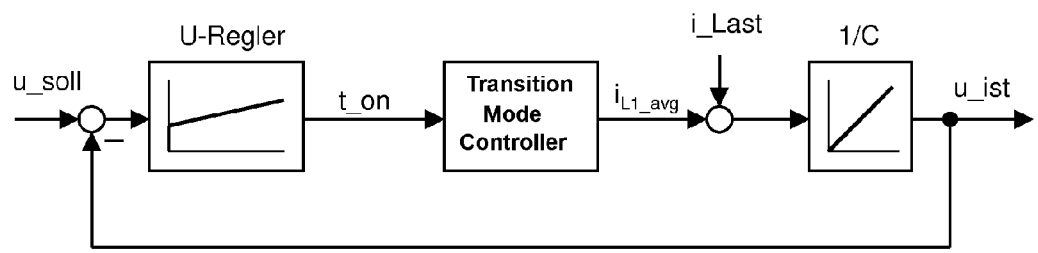
FIG. 13 illustrates a current control circuit for the bidirectional DC converter shown in FIG. 11.

FIG. 13 illustrates a current control circuit for the bidirectional DC converter shown in FIG. 11. This current control circuit results from being able to prescribe the switch-on time t_on as described above. In this current control circuit, a subordinate control circuit is no longer needed because the DC converter is always operating in the transition mode due to the detection of the current null passage, thus continuously operating in the critical conduction mode and thus t_on is proportional to $i_{L1\_avg}$. The respective load condition is taken into consideration in this current control circuit by the load current variable i_Last.

However, a disadvantage of operating in the critical conduction mode is the relatively large amount of ripple in inductor current $i_{L1}$ and thus the relatively large amount of ripple in the output current ($i_1$ or $i_2$).

Figure 1:
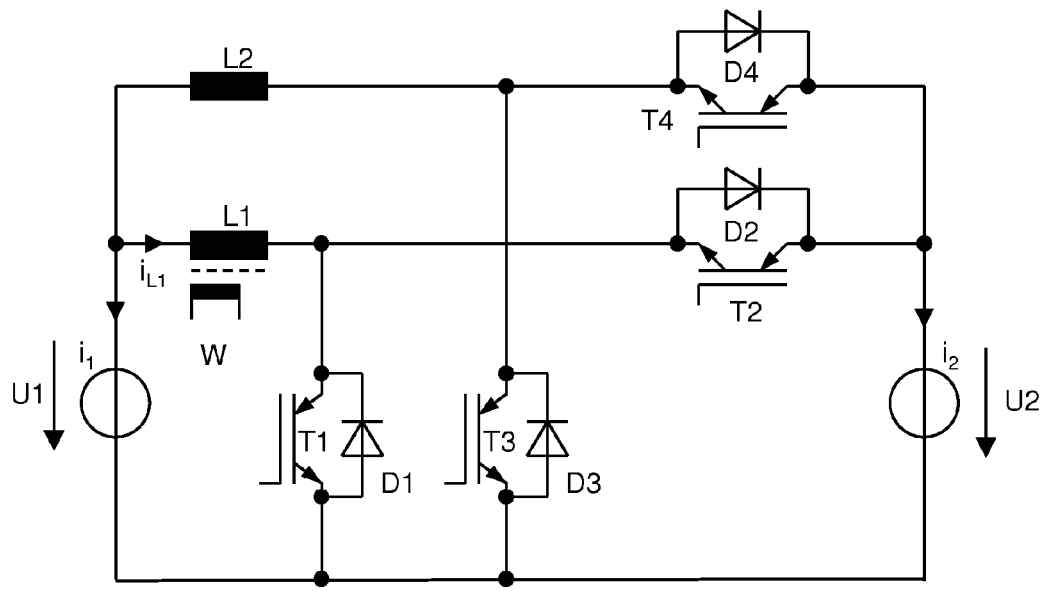
FIG. 1 illustrates a multichannel bidirectional DC converter in accordance with an embodiment of the present invention.

Referring now to FIG. 1, a multichannel bidirectional DC converter in accordance with an embodiment of the present invention is shown. This DC converter is designed to reduce the ripple in inductor current $i_{L1}$ and hence reduce the ripple in output current $i_1$ or $i_2$. To this end, this DC converter includes a plurality of current channels as opposed to a single current channel like the DC converter shown in FIG. 2. The current channels are parallel to one another.

In the embodiment shown in FIG. 1, the DC converter includes first and second parallel current channels I and II. Additional parallel current channels can be provided to further reduce the ripple in output current $i_1$ or $i_2$.

First channel I is formed by inductor L1 and an associated winding W, first and second switches T1 and T2, and first and second diodes D1 and D2. Second channel II is similarly formed by a second inductor L2, third and fourth switches T3 and T4, and third and fourth diodes D3 and D4. As such, second inductor L2 lacks a winding W.

Both channels I and II are clocked at the same pulse rate, but with a respective time delay. For instance, first channel I is clocked, and then after a time delay, second channel II is clocked. That is, switch T1 or T2 of first channel I is turned on and then after a time delay switch T3 or T4 of second channel II is turned on. Subsequently, switch T1 or T2 of first channel I is turned off and then after the time delay switch T3 or T4 of second channel II is turned off. A micro-controller for pulsing the switches (T1, T3 or T2, T4) can thereby be used to control the other respective switches (T1, T3 or T2, T4) of channels I and II.

Unlike first inductor L1 in first channel I, second inductor L2 in second channel II does not have an associated winding W. As such, the ability to detect a current null passage of second inductor L2 is lacking. As a result, second channel II is controlled dependent on the current null passage detected in first channel I. Thus, second channel II is a "slave channel" whereas first channel I, whose inductor L1 has winding W for current null passage detection, is a "master channel."

The ripple in output current $i_1$ or $i_2$ is minimal when the phase displacement between the master channel and the one or more slave channels is 360°/n (where n=total number of channels). In this embodiment, the ripple in output current $i_1$ or $i_2$ is minimal when the phase displacement between first channel I and second channel II is 180°. The micro-controller determines the period of first channel I from the detected current null passages and obtains the trigger point for second channel II (and any additional slave channels) from this information.

Figure 14:
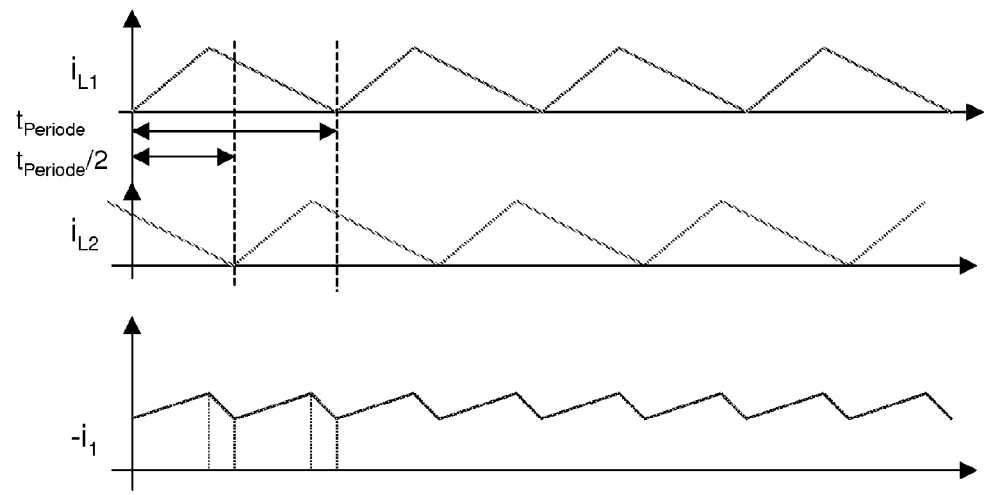
FIG. 14 illustrates current profile diagrams for the multichannel bidirectional DC converter shown in FIG. 1 in boost converter mode.

Referring now to FIG. 14, current profile diagrams for the DC converter shown in FIG. 1 in boost converter mode are shown. The upper diagram illustrates current $i_{L1}$ through inductor L1 in first channel I; the middle diagram illustrates current $i_{L2}$ through inductor L2 in second channel II; and the lower diagram illustrates output current $i_1$ (here inverted as $-i_1$). The micro-controller determines the time interval for the current null passages $T_{Period}$ of first channel I in real time so that from this information the trigger point of second channel II can be determined. As a total of two current channels (n=2) are implemented here, the time displacement for controlling the switch (T3 or T4) of second channel II is $1/n*T_{Period}=½*T_{Period}=T_{Period}/2$ with respect to the control of the switch (T1 or T2) of first channel I.

As shown in the lower diagram of FIG. 14, the resulting output current $i_1$ (here inverted as $-i_1$) exhibits a clearly smaller ripple than each of inductor currents $i_{L1}$ and $i_{L2}$ in current channels I and II. In a practical implementation, it is advantageous to provide a plurality of slave channels instead of only second channel II because an even smoother output current can be achieved.

Figure 15:
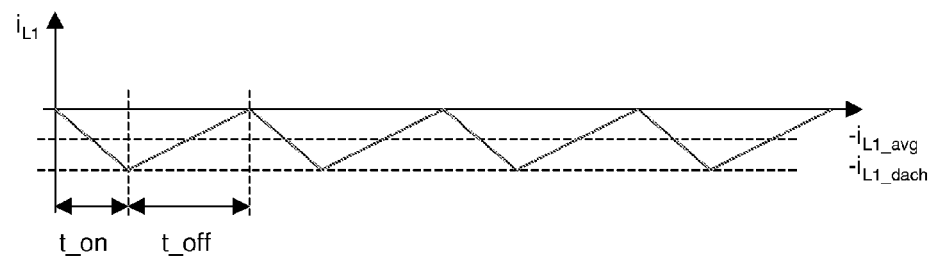
FIG. 15 illustrates a current profile diagram of the bidirectional DC converter shown in FIG. 11 in buck converter mode.

Referring now to FIG. 15, a current profile diagram of the bidirectional DC converter shown in FIG. 11 in buck converter mode is shown. Alongside the previously described boost converter operation, the DC converter shown in FIG. 11 can also be driven as a buck converter, which is of particular interest for photovoltaic power inverters used with a battery buffer. For buck converter operation, similar conditions hold true as for boost converter operation. The following conditions are found from the behavior of inductor current $i_{L1}$ of inductor L1 sketched in FIG. 15:

$$i_{L1\_dach} = u_1 * (t\_off/L) \quad i_{L1\_dach} = (u_2 - u_1) * (t\_on/L)$$

In buck converter operation, the shutoff time t_off is proportional to the maximum current $i_{L1\_dach}$ or the average current $i_{L1\_avg}$ through inductor L1. However, as the micro-controller can directly adjust only the switch-on time t_on, an additional condition is introduced to be able to implement the control. The following relationship can be derived from the two most recently indicated equations:

$$t\_on = (t\_off * u_1)/(u_2 - u_1)$$

As the micro-controller detects voltages $u_1$ and $u_2$, it can calculate the required switch-on time t_on, which then leads to the desired t_off. As can be seen in FIG. 15, the sum of t_on and t_off produces precisely the time between two current null passages detected by the micro-processor. As long as the circuit operates in critical conduction mode a direct shift of $i_{L1\_avg}$ is possible without a delay.

Figure 16:
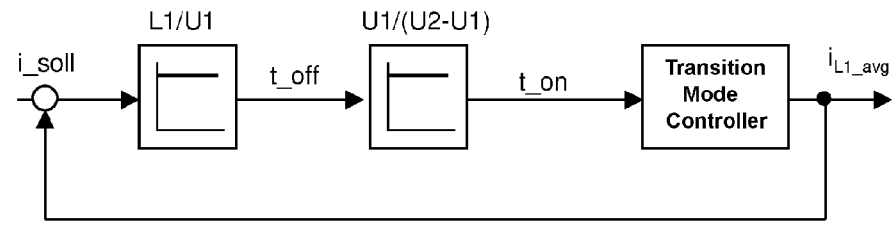
FIG. 16 illustrates another current control circuit for the bidirectional DC converter shown in FIG. 11.
Figure 17:
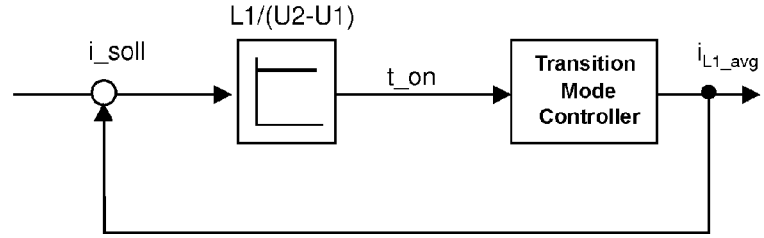
FIG. 17 illustrates a simplified representation of the current control circuit shown in FIG. 16.

FIG. 16 illustrates another current control circuit for the bidirectional DC converter shown in FIG. 11. This current control circuit results from being able to prescribe the desired t_off as described above. If buck converter operation is used to charge a storage battery, it is generally the case that no overlapping voltage control circuits are required. The set-point value of the charging current i_soll can be specified directly by the micro-controller. The two proportional members (L1/U1, U1/(U2−U1)) in FIG. 16 can then still be combined to a single proportional member L1/(U2−U1), whereby the control circuit shown in FIG. 17 is obtained. Use of the Transition Mode Controller allows the current to be adjusted directly and without delay and without a subordinate control circuit.

Figure 18:
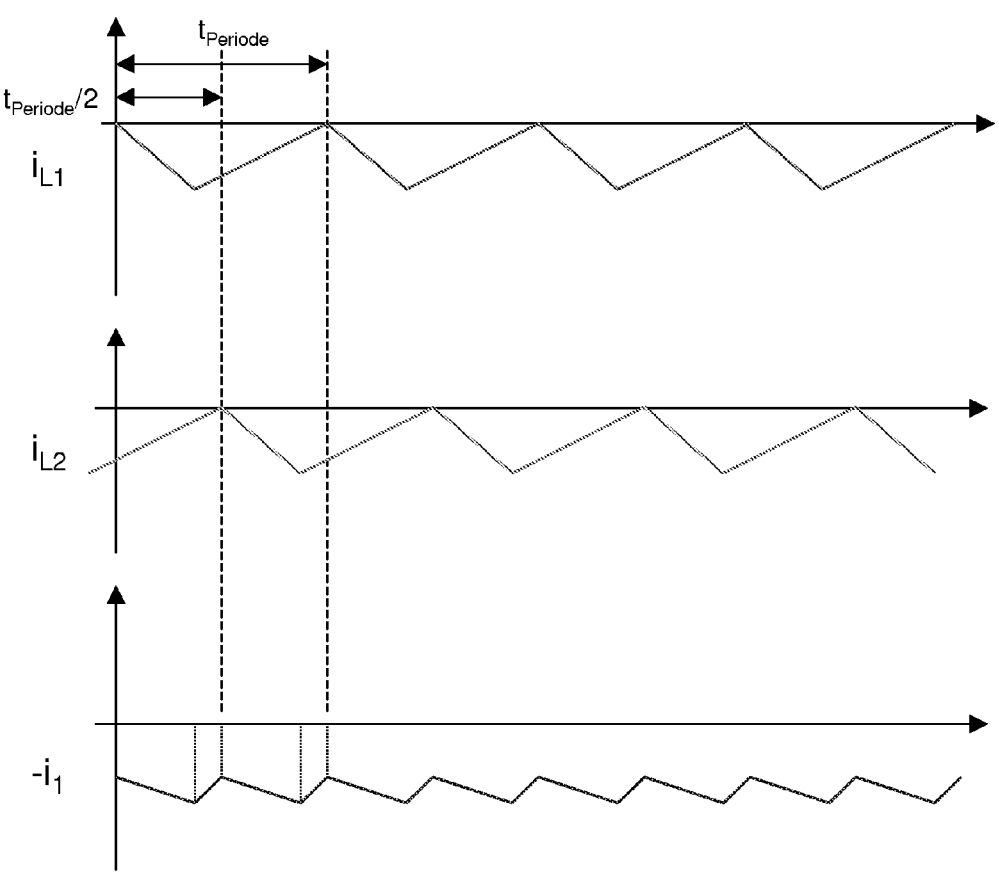
FIG. 18 illustrates current profile diagrams for the multi-channel bidirectional DC converter shown in FIG. 1 in buck converter mode.

Referring now to FIG. 18, current profile diagrams for the DC converter shown in FIG. 1 in buck converter mode are shown. The upper diagram illustrates current $i_{L1}$ through inductor L1 in first channel I; the middle diagram illustrates current $i_{L2}$ through inductor L2 in second channel II; and the lower diagram illustrates output current $i_1$ (here inverted as $-i_1$). The behavior of inductor currents $i_{L1}$, $i_{L2}$ correspond precisely to the inverted current behaviors for boost converter mode, which can be seen in FIG. 14. Correspondingly, an especially flat output current ($-i_1$) is obtained in buck converter operation through a time-displaced control of current channels I, II.

REFERENCE SYMBOLS

1 Solar generator
2 Unidirectional DC boost converter
3 DC intermediate circuit
4 Power inverter
5 Storage battery
6 Bidirectional DC converter
D1-D4 (Free-running) diode
I First current channel (master channel)
II Second current channel (slave channel)
L Inductance (of the inductor)
L1, L2 Inductor (choke coil)
T1-T4 Semiconductor switch (transistor)
U1, U2 Voltage source
P1, P2, P3 Output phases
$u_Z$ Voltage in the DC intermediate circuit
$u_B$ Voltage in the storage battery
W Winding
$i_1$, $i_2$ Output current
$i_{T1}$, $i_{D2}$, etc. Current (through the respective indexed component)
$i_{L1\_avg}$ Average output current
i_ist Instantaneous current
u_Last Load current
i_soll Current set point
t_on Switch-on time
t_off Switch-off time
TPeriod Period (time interval between null passages)
TPeriod/2 Time offset
u_ist Instantaeous value (output voltage)
u_soll Set point voltage
$u_1$, $u_2$ Voltages of the voltage sources U1 and U2
$u_{T1}$, $u_{T2}$ Control voltage (of the switches)
1/C, 1/L Integrating controller
L1/U1, etc. Proportional elements While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A multichannel bidirectional DC converter comprising:
a first current channel having a first inductor, a first switch, and a second switch, the first current channel further having a device operable for detecting a current null passage of current of the first inductor, the device being an additional element physically separate from the first inductor;
a second current channel in parallel to the first current channel, the second current channel having a second inductor, a third switch, and a fourth switch; and
a controller operable for controlling the switches to turn on and off such that the current channels can be driven in either a boost converter mode or a buck converter mode at a given time;
the controller further operable with the device of the first current channel for detecting a period of the current null passage of the first inductor;
wherein the controller drives the first and second current channels with a time delay with respect to one another based on the detected period such that the first and second current channels operate in a critical conduction mode.

2. The converter of claim 1 wherein:
the time delay is the detected period divided by the number of current channels.

3. The converter of claim 1 wherein:
the device of the first current channel is a winding associated with the first inductor of the first current channel.

4. The converter of claim 1 wherein:
the current channels generate an output current proportional to the switch on time for one of the switches of each of the first and second current channels.

5. The converter of claim 1 wherein:
a superposed voltage control circuit of the controller generates a control voltage to control the switch on time of the switches in the boost converter mode.

6. The converter of claim 1 wherein:
in the buck converter mode, the switch on time of the switches is proportional to the average output current of the current channels and inversely proportional to a voltage difference between output and input ends of the current channels.

7. The converter of claim 1 wherein:
the converter is a component of a charge/discharge circuit for a storage battery of a photovoltaic plant.

8. The converter of claim 7 wherein:
the controller controls the current channels to charge the storage battery as a buck converter and to discharge the storage battery as a boost converter.

9. The converter of claim 1 wherein:
the first current channel further includes a first diode connected in parallel to the first switch and a second diode connected in parallel to the second switch;
the second current channel further includes a third diode connected in parallel to the third switch and a fourth diode connected in parallel to the fourth switch.

10. A multichannel bidirectional DC converter assembly comprising:
first and second DC voltage sources, wherein the voltage of the second voltage source is greater than the voltage of the first voltage source;
a DC converter having first and second current channels connected between the first and second voltage sources and connected in parallel to one another, the first current channel having a first inductor, first and second switches, and a winding associated with the first inductor for detecting null passages of current in the first inductor, the second current channel having a second inductor and third and fourth switches; and
a controller operable for controlling the switches to continuously turn on and off such that the current channels can be driven in either a boost converter mode or a buck converter mode at a given time, wherein in the boost converter mode the controller continuously turns on and off the first and third switches with a time delay with respect to one another while the second and fourth switches remain turned off such that energy flows from the first voltage source toward the second voltage source, wherein in the buck converter mode the controller continuously turns on and off the second and fourth switches with a time delay with respect to one another while the first and third switches remain turned off such that energy flows from the second voltage source toward the first voltage source;
the controller operable with the winding associated with the first inductor for detecting the period of the null passages of the current in the first inductor;
wherein the time delay used by the controller in controlling the switches is based on the detected period such that the first and second current channels operate in a critical conduction mode operation state while being driven in either the boost converter mode or the buck converter mode.

11. The assembly of claim 10 wherein:
the time delay is the detected period divided by the number of current channels.

12. The assembly of claim 10 wherein:
the current channels generate an output current proportional to the switch on time of the switches.

13. The assembly of claim 10 wherein:
a superposed voltage control circuit of the controller generates a control voltage to control the switch on time of the switches in the boost converter mode.

14. The assembly of claim 10 wherein:
in the buck converter mode, the switch on time of the switches is proportional to the average output current of the current channels and inversely proportional to the voltage difference between the second voltage source and the first voltage source.

15. The assembly of claim 10 wherein:
the second voltage source is a DC intermediate circuit of a photovoltaic plant and the first voltage source is a storage battery, wherein the converter is a component of a charge/discharge circuit for the storage battery.

16. The assembly of claim 15 wherein:
the controller controls the current channels to charge the storage battery as a buck converter and to discharge the storage battery as a boost converter.

17. The assembly of claim 10 wherein:
the first current channel further includes a first diode connected in parallel to the first switch and a second diode connected in parallel to the second switch;
the second current channel further includes a third diode connected in parallel to the third switch and a fourth diode connected in parallel to the fourth switch.

18. The assembly of claim 17 wherein:
the first diode is poled to conduct current in a direction opposite to the direction of current through first switch and the second diode is poled to conduct current in a direction opposite to the direction of current through the second switch.

19. A multichannel bidirectional DC converter comprising:
a first current channel having a first inductor, a first switch, and a second switch, the first current channel further having a device operable for detecting a current null passage of current of the first inductor, the device being an additional element physically separate from the first inductor;
a second current channel in parallel to the first current channel, the second current channel having a second inductor, a third switch, and a fourth switch; and
a controller operable for controlling the switches to turn on and off such that the current channels can be driven in either a boost converter mode or a buck converter mode at a given time;
the controller further operable with the device of the first current channel for detecting a period of the current null passage of the first inductor;
wherein the controller drives the first and second current channels in a critical conduction mode by controlling one of the first and second switches of the first current channel and one of the third and fourth switches of the second current channel to turn on and off with a time delay with respect to one another based on the detected period.

20. The converter of claim 19 wherein:
the time delay is the detected period divided by the number of current channels of the converter.

* * * * *